T. VON ZWEIGBERGK.
CONTROLLER.
APPLICATION FILED SEPT. 14, 1907.

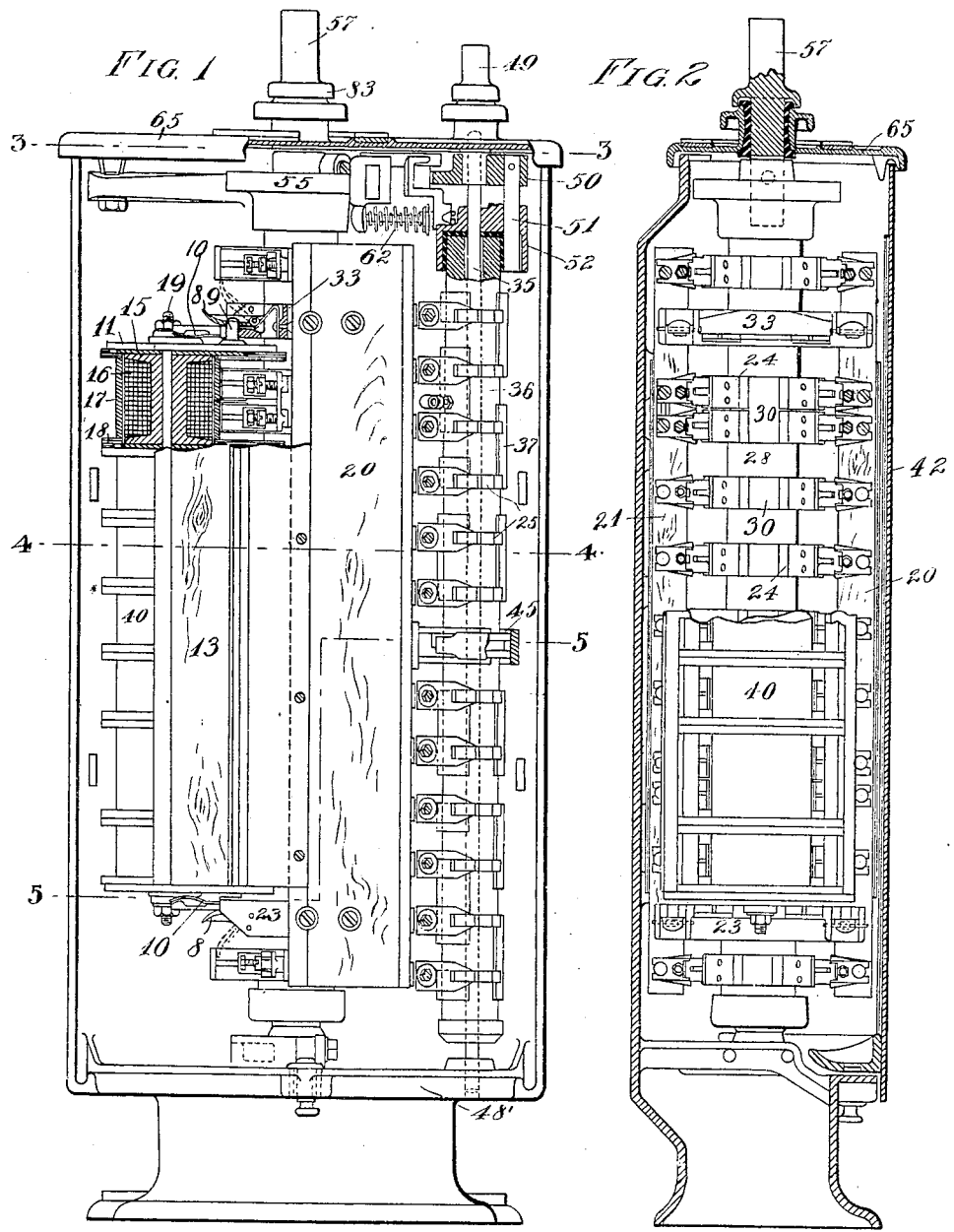

918,638.

Patented Apr. 20, 1909.
5 SHEETS—SHEET 2.

WITNESSES:
Brennan B. West.
Nathan F. Fretter

INVENTOR
Thorsten von Zweigbergk
BY Bate, Fouts & Hull
ATTYS.

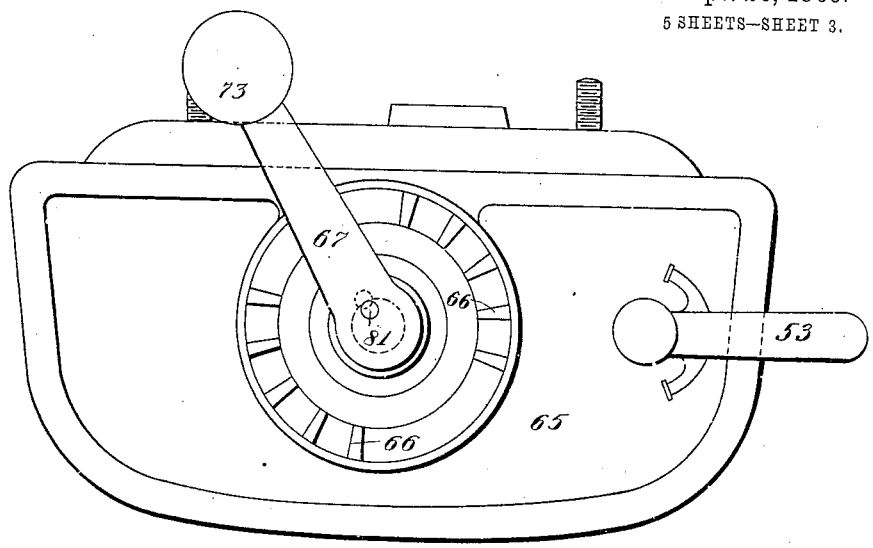
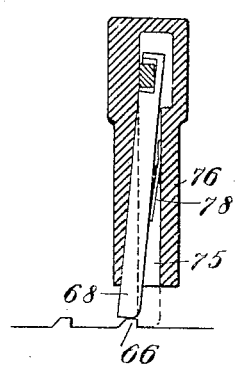
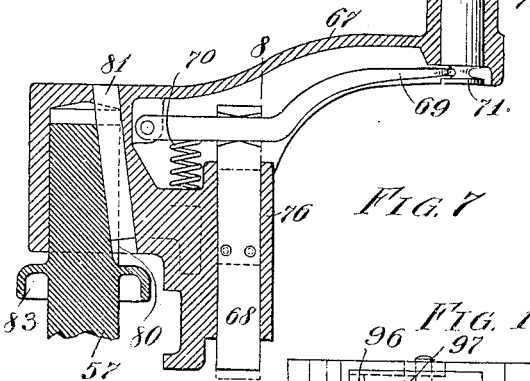
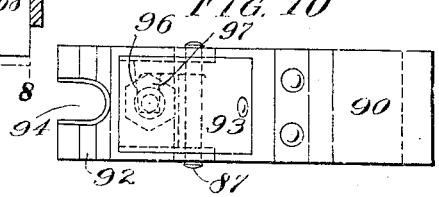
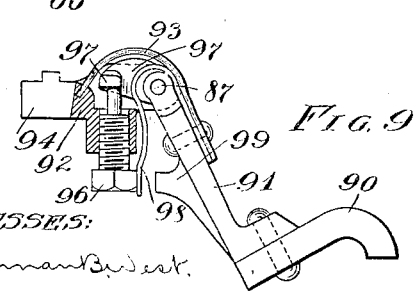

T. VON ZWEIGBERGK.
CONTROLLER.
APPLICATION FILED SEPT. 14, 1907.
918,638.
Patented Apr. 20, 1909.
5 SHEETS—SHEET 4.
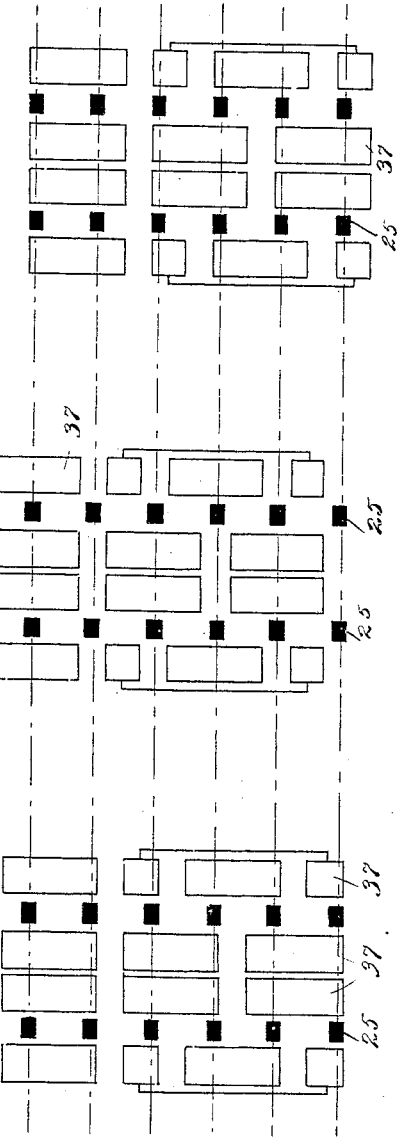
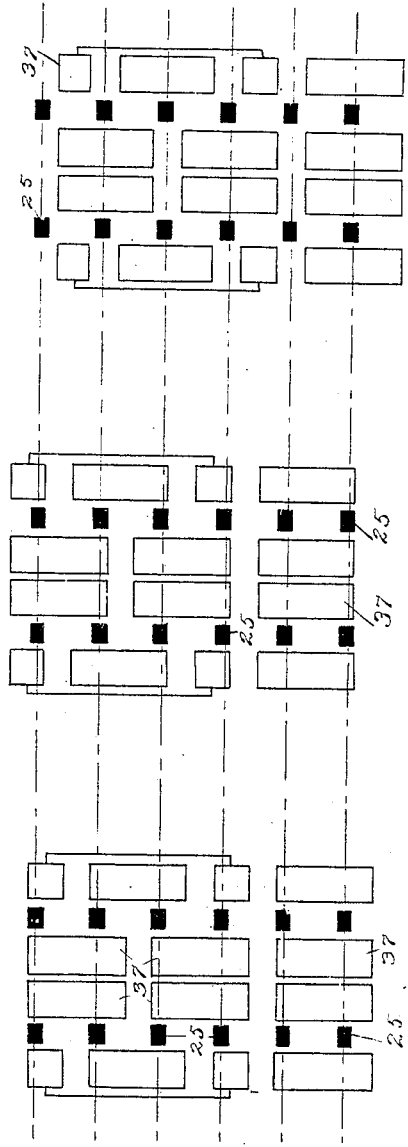

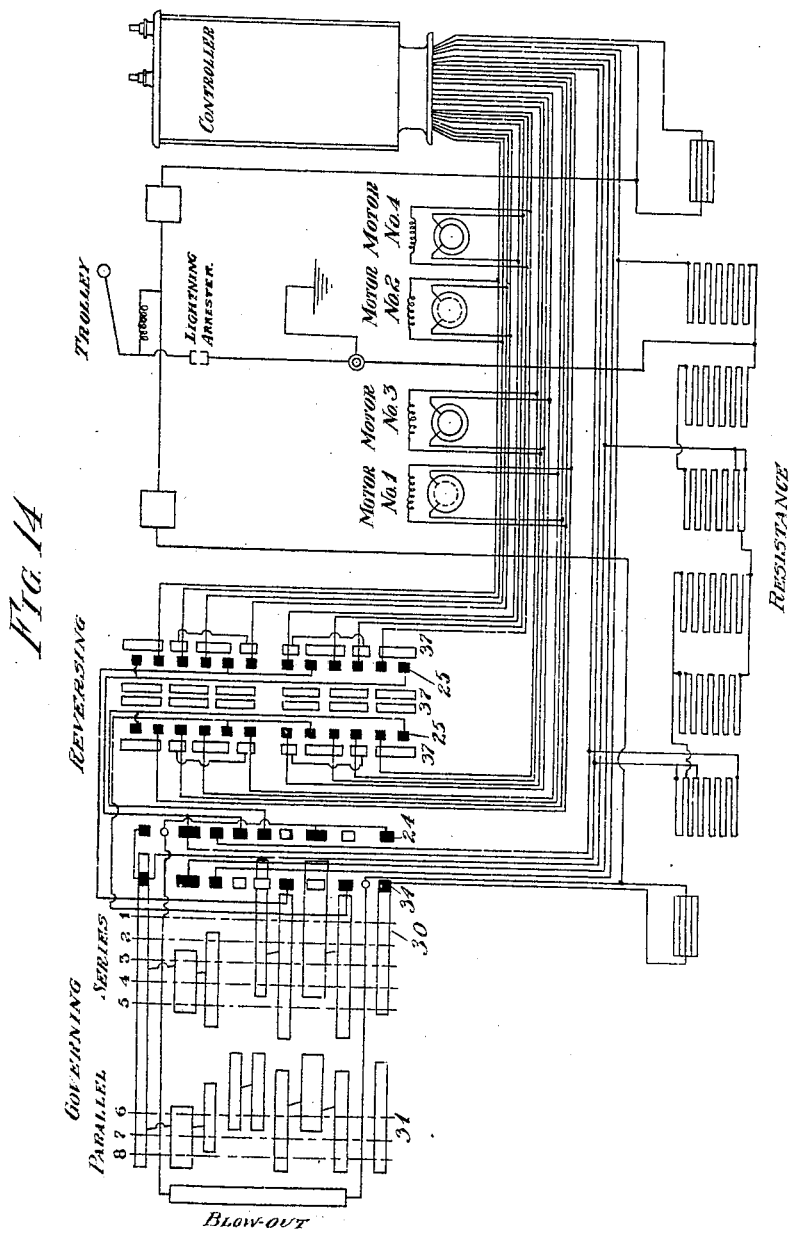

UNITED STATES PATENT OFFICE.

THORSTEN VON ZWEIGBERGK, OF PRESTON, ENGLAND, ASSIGNOR, BY MESNE ASSIGNMENTS, TO GENERAL ELECTRIC COMPANY, A CORPORATION OF NEW YORK.

CONTROLLER.

No. 918,638.          Specification of Letters Patent.          Patented April 20, 1909.

Application filed September 14, 1907. Serial No. 392,886.

*To all whom it may concern:*

Be it known that I, THORSTEN VON ZWEIGBERGK, a citizen of the United States, residing at Preston, in the county of Lancaster, England, have invented a certain new and useful Improvements in Controllers, of which the following is a full, clear, and exact description, reference being had to the accompanying drawings.

The object of this invention is to provide a simple and compact controller of a type suitable for railway service and the like.

The invention comprises the general arrangement of parts and details thereof, including a number of novel features which contribute to the efficiency of the controller. Among these may be mentioned the arrangement and mechanism for cutting out a defective motor; the contact fingers so arranged that their adjusting screws are locked by the main springs; the blow out; the special indicating arrangement operated by the controller handle; the construction and fastening arrangement of that handle, and the arrangement of the contact fingers in two sets on two connection boards. These features will be more fully hereinafter described and the essential characteristics set out in the claims.

Figure 3:
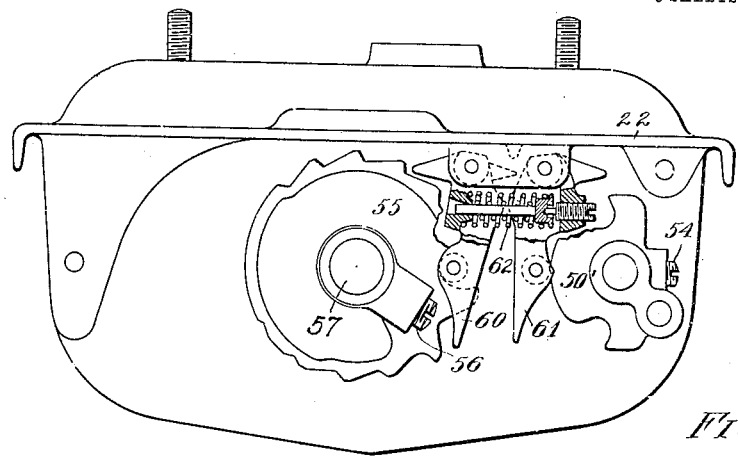
Figure 4:
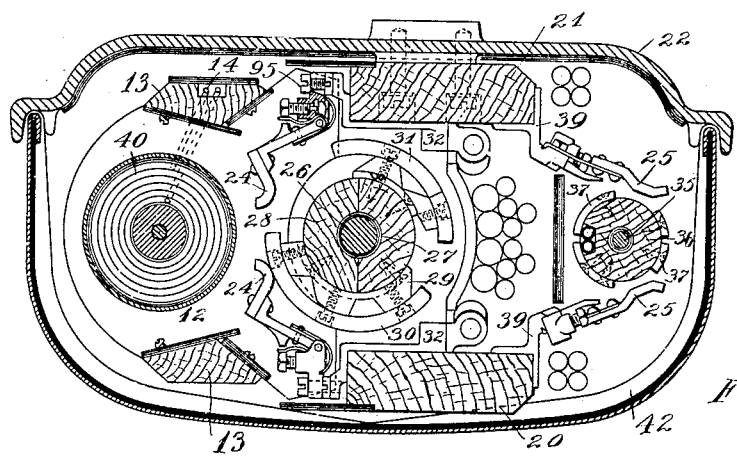
Figure 5:
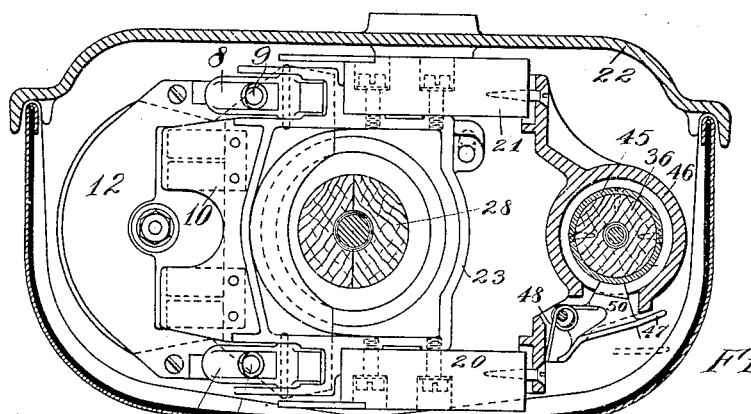

In the drawings, Figure 1 is a front elevation of the controller; Fig. 2 is a sectional side elevation thereof looking from the left; Figs. 3, 4 and 5 are horizontal sections, substantially on the correspondingly numbered lines of Fig. 1; Fig. 6 is a plan of the top plate of the controller; Fig. 7 is a vertical section through the handle; Fig. 8 is a cross section of the same on the line 8—8 of Fig. 7; Fig. 9 is a side elevation of one of the contact fingers; Fig. 10 is a plan of such finger; Figs. 11, 12 and 13 are three diagrams indicating the different positions of the reversing switch; Fig. 14 is a complete wiring diagram of a car equipped with this controller.

Referring first to Figs. 1 to 5 inclusive, 20 and 21 represent two connection boards which extend vertically at the front and back of the controller, the board 21 being secured to the back plate 22 of the controller case and the board 20 being fastened by screws to brackets 23 and 33 secured to the back plate. Secured to each connection board are two sets of contact fingers, one set 24 coöperating with the governing cylinder, and the other set 25 coöperating with the reversing cylinder. The governing cylinder comprises a shaft 26 having an insulating sleeve 27, around which is a segmental wooden cylinder 28, to which are secured the contact arms 29 having removable contact segments. These segments are arranged in two sets 30 and 31, as shown more particularly in the diagram, Fig. 14. The contact fingers 24, carried by both the front and rear connection boards, cooperate with these segments. These contact fingers (which will be hereinafter more specifically described) are mounted on brackets 32 which are secured on the sides of the connection boards and extend around their edges, as shown in Fig. 4, the contact fingers thus springing in the instance shown from the left hand corner of the boards.

The reversing switch comprises the shaft 35 which is surrounded by an insulating sleeve, the sleeve being surrounded by the wooden cylinder 36. On the surface of this cylinder are contact plates 37 arranged in two sets to coöperate with the two sets of contact fingers 25. These latter fingers are carried by brackets 39, which, as shown, are secured to the right hand corners of the connection boards.

The blow out designated 40 stands vertically with its axis in the plane passing through the shafts of the governing and reversing cylinders. The blow out comprises individual cores 15, windings 16, metallic cylindrical shields 17, insulating transverse shields 18, and a through bolt 19 binding the whole structure together. The terminals of the successive blow out coils are connected as shown at 14, Fig. 4, through one of the vertical wooden shield bars 13, located at the front and back of the controller. At the upper and lower ends of the blow out are horizontal terminal plates 11 and 12. These plates are adapted to be engaged by the contact fingers 10 carried by the brackets 23 and 33, to make a good electrical connection, the blow out being held in place by pins 9 which are engaged by pivoted spring-pressed fingers 8 carried by these brackets. When these fingers are turned away from the blow-out, as shown in dotted lines in Fig. 1, the same may be removed, while when the rearmost fingers release their pins 9, the blow out becomes hinged on the front pins 9 and may be swung forward on its pins without breaking the electrical connection through the blow out.

The described arrangement of governing cylinder, reversing cylinder, blow out and connection boards, makes a very simple and compact controller. When the front 42 of the controller casing is removed, convenient access is at once had to the reversing switch and its contact fingers, while by simply swinging the blow out aside on its hinges, the governing fingers may be easily reached. The whole interior of the casing may be conveniently removed and the connection boards and the parts they carry easily taken off for repairs.

The controller shown is adapted to control four motors arranged in two sets, as shown in the diagram (Fig. 14) where motors 1 and 2 constitute one set and Nos. 3 and 4 the other set. In cutting out a disabled motor, it is preferable to cut out the complete pair, thus enabling the controller to operate the remaining pair in series and parallel. In order to conveniently cut out either pair of motors as desired, the reversing switch has been arranged in this invention so that its barrel may be longitudinally shifted, the shifting in one direction cutting out one set of motors, and that in the other direction cutting out the other set. The mechanism by which this is accomplished will now be described.

Mounted on the barrel of the reversing switch, near the middle of its length, is a grooved ring 45 which operates loosely within a bracket 46, which is secured to the edge of the two connection boards. Pivoted to this bracket is a locking finger 47 which is forced toward the reversing switch by a spring 48. This finger is provided with a tooth 50 adapted to project through an opening in the bracket, and normally occupying the groove in the ring 45. In this position the reversing switch has all of its contact plates in position to aline with the two sets of contact fingers 25. These plates, however, are farther apart than the width of the contact fingers, and the ring 45 is so proportioned that if the locking finger is withdrawn and the barrel elevated or depressed until the finger returns to position above or below the ring, the plates will be shifted so that certain of the contact fingers will be out of the alinement with the contact plates. This cuts out the corresponding motors.

The cutting out operation is illustrated in Figs. 12 and 13; Fig. 11 shows the normal condition of the parts; Fig. 12 shows the condition when the reversing switch has been elevated so that the tooth 50 lies beneath the ring 45. In this position the motors controlled by the upper half of the contact fingers 25, (that is the motors Nos. 1 and 2 in Fig. 14) will be cut out. Fig. 13 shows the relative position of the contact fingers and segments when the barrel has been shifted downward. In this case the lower sets of segments are rendered ineffective, cutting out motors Nos. 3 and 4. When either pair of motors is cut out the other pair is controlled in series and parallel as usual. In order to allow the up and down movement to the reversing switch barrel, the shaft 35 of this barrel is slidably mounted in the base 48' of the controller and slidably in a socket in the operating stem 49 which carries the handle 53. Rigid on this stem is the indicator wheel 50'. This wheel carries a pin 51 slidable in a hole in the head 52 on the reversing switch. This pin furnishes the means for driving the reversing switch from the stem 49 and allows shifting as explained.

Fig. 3 shows a usual form of indicating wheels and interlocking mechanism for the two barrels. The indicator wheel 50, as stated, is on the stem of the reversing switch being secured by the set screw 54, and the indicator wheel 55 is rigid with the governing barrel, and is secured by the set screw 56 to the stem 57, which seats in this indicator wheel and operates the barrel. Between the two indicating wheels are the arms 60 and 61, carrying rollers coöperating with the wheels, these arms being pressed apart by a spring 62 and being so constructed that there is only room for one of them at a time to be out of engagement with a notch in its indicator wheel.

To give a decided stop for each indicator notch, the following mechanism is provided. On the top plate 65 of the controller are mounted the raised substantially radial lugs 66 corresponding to the indicator notches, and mounted vertically in the handle 67 is a dog or pawls 68 which is adapted to engage these lugs. Engaging with the upper portion of this dog is a lever 69, which is pressed upward by spring 70 and has its extreme end occupying a groove 71 in the stem 72 of knob 73. The spring 70 has sufficient force to elevate the knob and dog. The natural downward pressure of the operator's hand, however, is sufficient to depress the spring and lower the dog so that it extends in the way of the lug in advance thereof, this lowered position of the dog being indicated by dotted lines in Fig. 7.

The dog is mounted loosely in a guideway 75 formed in a downward extension of the main portion of the handle. This guideway 75 flares downwardly as shown in Fig. 8 to allow the dog some movement in the general direction in which the handle travels. A spring 78 on the back side of the dog normally holds it in its forward position, as shown in Fig. 8. When, however, the dog engages a lug 66, it swings rearward into the position shown by dotted lines in Fig. 8. Now, as the operator slightly releases the pressure of his hand on knob 73, the spring 70 lifts the knob and dog. The dog thus goes back into normal position ready to engage the next lug when the handle moves up to it.

In order to secure a good fastening between the handle 67 and the spindle 57, a hole 80 is drilled slightly diagonally through the handle and spindle, crossing their junction, and in this hole within the handle is sweated a pin 81. This pin, when the handle in place, finds its bearing in the groove in the spindle and wedges against the spindle, making a perfectly firm hold. At the same time the handle may be removed from the spindle whenever desired. The spindle is provided with an umbrella 83 to prevent water from entering the interior of the controller.

The contact finger which I employ for the governing controller is shown in Figs. 4, 9 and 10. It includes the removable tip 90, the shank 91, the bracket 92, to which the shank is pivoted at 87, the copper shunt 93 connected to the finger and bracket. This bracket 92 is provided with a slotted opening 94 and is secured by a screw 95 (Fig. 4) to the bracket 32 carried by the connection boards. The slotting of the opening 94 allows the removal of the finger as a whole whenever desired. 96 indicates a stop screw which screws through the bracket 92 and has its inner end in position to be engaged by an arm 97 of the finger which extends from the pivot across the end of the screw. The main spring 98 for the finger is riveted to its shank 91 and lies against the hexagon head of the crew 96. By this means the spring itself forms the lock for the screw, obviating the necessity for a special locknut, and allowing the adjustment to be made quickly and with more ease. An outward stop for the finger is provided by the lug 99 thereof, adapted to abut the spring and head of the screw 96.

Fig. 14 shows the wiring diagram of a complete car equipment. As will be seen, the car is equipped with two controllers and four motors and suitable resistance. The controllers, of which the left hand one is shown in diagram, are of the series-parallel type, and the segments, connections and circuits will be apparent. The contact fingers of the reversing switch, and those of the governing controller to which connections are made, are indicated by solid, black rectangles. Certain additional contact fingers are provided on the governing controller indicated by hollow rectangles. These latter fingers have no circuits and are provided to serve as wipers for the arcs to spring from.

Having described my invention, I claim:

1. In a controller, the combination of two connection boards opposite each other, power and reversing cylinders in the plane between the boards, and contact fingers carried by the two boards for said cylinders.

2. In a controller, the combination of a pair of connection boards opposite to each other, power and reversing cylinders located in the general space between the boards, contact fingers for the reversing cylinder projecting from the boards near one edge, and contact fingers for the power cylinder projecting from the boards near their other edge.

3. In a controller, the combination with the back of the casing of a connection board in front thereof, a controller barrel in front of said connection board, another connection board in front of said controller barrel, and contact fingers carried by both boards coöperating with the said barrel.

4. In a controller, the combination of a connection board, two sets of contact fingers projecting diagonally from the corners of the board, a governing barrel and a reversing switch located substantially in front of the connection board in position to be engaged by the respective fingers, and another connection board and contact fingers located on the front side of the governing barrel and placed symmetrically to the connection board and fingers first mentioned, and coöperating with the governing barrel and reversing switch respectively.

5. In a controller, the combination of two connection boards, contact fingers carried thereby, and a governing cylinder, a separate reversing cylinder and a blow out device all located in the space which extends between said boards.

6. In a controller, the combination of a barrel adapted to turn on an axis and having contact segments, coöperating contact fingers, and means for changing the presentation of the barrel and fingers to each other in the direction of the axis of the barrel, a plurality of motors, conductors connecting the motors with the contact fingers whereby such change of presentation may cut out or cut in a motor.

7. In a controller, the combination with a reversing barrel, and contact fingers, of mechanism arranged to hold the barrel in various longitudinal positions with reference to the fingers whereby different motors may be cut out.

8. In a controller, the combination, with a barrel carrying segments and adapted to turn on an axis, of contact fingers, and mechanism arranged to hold the barrel in various longitudinal positions with reference to the fingers while allowing free rotation of the barrel, a plurality of motors, conductors connecting the motors with the contact fingers whereby such change of presentation may be cut out or cut in a motor.

9. In a controller, a combined reversing and motor-cutout switch comprising a barrel carrying contact segments arranged for rotary and longitudinal movement, contact fingers coöperating with said segments there being space between the segments greater than the width of the contact fingers, and means for shifting the barrel and fingers with reference to one another in the direction of the axis of the barrel, the segments and contact fingers being so arranged and connected to the motor circuits that when the barrel and fingers are in their mid-position with reference to one another all the motors are in circuit and when the barrel and fingers are in their other positions with reference to one another either one motor group or the other motor group is cut out of circuit.

10. In a controller, the combination with contact fingers of a barrel carrying segments and adapted to turn on an axis and adapted to be shifted axially, an annular shoulder on the periphery of said barrel, and a movable member adapted to engage said shoulder.

11. In a controller, the combination with a barrel adapted to turn on an axis and adapted to be shifted axially, of a grooved ring on said barrel, and a movable tooth adapted to occupy said groove.

12. In a controller, the combination of a barrel mounted to turn on an axis, segments carried thereby, a grooved member carried by said barrel, and a pivoted locking finger having a tooth adapted to occupy such groove.

13. In a controller, the combination of a reversing switch having a barrel on which are mounted segments, a grooved member secured around said barrel, a bracket having a bore to receive said member, there being an opening into such bore, and a locking member having a tooth adapted to occupy such opening and engage in the groove.

14. In a controller, the combination of a switch having a barrel on which are mounted segments, a grooved member secured around said barrel, a bracket having a bore to receive said member, there being an opening into such bore, and a locking finger pivoted to such bracket and having a tooth adapted to occupy such opening and engage in the groove.

15. In a controller, the combination of a barrel, contact segments carried thereby, two sets of contact fingers coöperating therewith, two connection boards carrying said contact fingers respectively, a grooved ring carried by the barrel, and a locking finger having a tooth adapted to extend into the groove of such ring.

16. In a controller, the combination of a controller barrel, contact segments carried thereby, two sets of contact fingers coöperating therewith, two connection boards carrying said contact fingers respectively, a bracket surrounding the barrel, a grooved ring carried by the barrel and slidable within said bracket, a finger pivoted to the bracket on its outer side and having a tooth adapted to extend through an opening in the bracket into the groove of such ring.

17. In a controller, a blow out comprising a series of individual coils, each having a surrounding metallic shield, and hinges for said blow out adapted to preserve the electrical connection through the said blow out.

18. In a controller, the combination with a governing barrel, of a blow out therefor carried on hinges so that it may be swung away from the controller barrel, and means for preserving the electric connection through the blow out when so swung.

19. In a controller, the combination of a controller barrel, a blow out therefor comprising a series of individual coils, one above the other, terminals for the blow out at its upper and lower end, stationary brackets and movable locking fingers carried thereby adapted to engage pins extending from the ends of the blow out.

20. In a controller, the combination of a casing, a pair of brackets carried thereby, a controller barrel mounted in such brackets, locking fingers carried by such brackets and a blow out device comprising individual coils, one above the other, and terminal members for said coils carrying projections which said locking fingers may engage.

21. In a controller, the combination with locking fingers, of a blow out device comprising individual coils, one above the other, and pins carried at the opposite ends of the blow out and adapted to be engaged by said fingers, there being two of such pins for each end of the blow out and two coöperating locking fingers, whereby the release of certain pins by their fingers may allow the other pins and fingers to form a hinge connection.

22. In a controller the combination with a controlling shaft, of an operating handle, a dog carried thereby, fixed lugs with which said dog coöperates, said dog being biased out of engagement with said lugs, a depressible knob carried by said handle, and an operative connection between said knob and said dog whereby depression of said knob moves said dog into engagement with said lugs and release of said knob allows said dog to disengage from said lugs.

23. In a controller the combination with a controlling shaft, of an operating handle, a dog carried thereby and arranged for vertical movement in a socket in said handle, a depressible knob carried by said handle, a lever connection between said knob and said dog arranged in a recess in said handle, a spring arranged to bias said knob and said dog in an upward direction, and stopping lugs arranged in a circle in the path of the lower end of said dog when the latter is in its lower position.

24. In a controller the combination with a controlling shaft, of an operating handle, a dog carried thereby and arranged for vertical movement and slight movement in the "on" direction of travel of the handle, fixed lugs with which said dog coöperates, a depressible knob carried by said handle, a lever connection between said knob and said dog whereby the two move in a vertical direction in unison, means for biasing said dog and knob in an upward direction, and means for biasing said dog in the "on" direction of travel of the handle.

25. In a controller the combination of a handle, an extended hub at one end of the said handle, a vertical opening through said hub, a dog within said opening and loosely engaging the same, a lever engaging one end of the dog, said lever occupying a recess on the under side of the handle, a knob carried by the opposite end of the handle having a member which engages the said lever whereby when the knob is depressed the dog will engage notches upon the controller.

26. In a controller, the combination, with the segments, of a contact finger, a screw for adjusting the same, and a spring tending to move the finger toward the segments, said spring bearing against a flattened portion of the screw to lock the same.

27. In a controller, a contact finger having a pivoted shank, a stop screw for the fingers and a main spring secured to the shank and bearing against a flattened portion of the screw.

28. In a controller, a contact finger comprising a bracket, a shank pivoted thereto, a screw screwing into the bracket and forming a stop for the finger, and a spring secured to the shank and bearing against the head of the screw.

29. In a controller, a contact finger comprising a bracket, an arm pivoted thereto, a stop lug on the arm, a screw mounted in the bracket against which said lug abuts, and a spring secured to the arm and bending over the pivot thereof and bearing against a flattened head on the screw.

30. In a controller, a contact finger having an arm and an adjusting screw, and a spring acting to move the arm and to lock the screw.

In testimony whereof, I hereunto affix my signature in the presence of two witnesses.

THORSTEN VON ZWEIGBERGK.

Witnesses:
ALBERT H. BATES,
G. A. MYERS.